(12) United States Patent
Cohen et al.

(10) Patent No.: US 8,218,092 B1
(45) Date of Patent: Jul. 10, 2012

(54) APPARATUS FOR RECEIVING BOTH ANALOG AND DIGITAL TV SIGNALS

(75) Inventors: Yossef Cohen, Nofit (IL); Itamar Gold-Gavriely, Sunnyvale, CA (US); Avraham Epstein, Shekhanya (IL)

(73) Assignee: CSR Technology Inc., Sunnyvale, CA (US)

( * ) Notice: Subject to any disclaimer, the term of this patent is extended or adjusted under 35 U.S.C. 154(b) by 705 days.

(21) Appl. No.: 12/397,025

(22) Filed: Mar. 3, 2009

Related U.S. Application Data

(60) Provisional application No. 61/033,110, filed on Mar. 3, 2008.

(51) Int. Cl.
*H04N 5/455* (2006.01)
*H04N 5/60* (2006.01)

(52) U.S. Cl. .......................... 348/726; 348/736; 348/738

(58) Field of Classification Search .......................... None
See application file for complete search history.

(56) References Cited

U.S. PATENT DOCUMENTS

| | | | | |
|---|---|---|---|---|
| 4,476,484 A | * | 10/1984 | Haskell | 348/437.1 |
| 4,789,897 A | * | 12/1988 | Kappeler et al. | 348/726 |
| 5,016,205 A | * | 5/1991 | Shumway | 708/200 |
| 6,005,640 A | * | 12/1999 | Strolle et al. | 348/726 |
| 6,061,096 A | | 5/2000 | Limberg | |
| 6,348,955 B1 | | 2/2002 | Tait | |
| 6,369,857 B1 | * | 4/2002 | Balaban et al. | 348/555 |
| 6,864,827 B1 | * | 3/2005 | Tise et al. | 342/25 A |
| 7,102,692 B1 | | 9/2006 | Carlsgaard et al. | |

\* cited by examiner

*Primary Examiner* — Jefferey Harold
*Assistant Examiner* — Michael Teitelbaum
(74) *Attorney, Agent, or Firm* — Lando & Anastasi, LLP

(57) ABSTRACT

A television receiver includes a tuner, a bandpass filter, an intermediate frequency amplifier and a demodulator. The tuner has an input to receive radio frequency signals and an output to provide modulated analog and digital television signals at an intermediate frequency. The bandpass filter and the intermediate frequency amplifier provide a singular signal path to filter and amplify both the modulated analog and digital television signals at the intermediate frequency. The demodulator has a singular input coupled to the output of the intermediate frequency amplifier and a plurality of outputs. The plurality of outputs includes a first output to provide demodulated analog television signals in response to the output of the tuner providing modulated analog television signals at the intermediate frequency and a second output to provide demodulated digital television signals in response to the output of the tuner providing modulated digital television signals at the intermediate frequency.

20 Claims, 4 Drawing Sheets

APPARATUS FOR RECEIVING BOTH ANALOG AND DIGITAL TV SIGNALS

RELATED APPLICATIONS

This application claims priority under 35 U.S.C. §119(e) to U.S. Provisional Application Ser. No. 61/033,110 entitled "AN APPARATUS FOR DETECTING ANALOG AND DIGITAL TV SIGNAL," filed on Mar. 3, 2008, which is herein incorporated by reference in its entirety.

BACKGROUND OF INVENTION

1. Field of Invention

The present invention relates to television receivers capable of receiving both analog and digital television signals.

2. Discussion of Related Art

Television signals are capable of being broadcast in different formats, such as a modulated analog format and a modulated digital format. Televisions may be designed to handle multiple formats. For example, television receivers within many televisions are capable of receiving radio frequency signals including both modulated analog television signals and modulated digital television signals. The television receiver is designed to process (e.g. filter, amplify and demodulate) both modulated analog television signals and modulated digital television signals.

A current approach for such a television receiver design will now be described with reference to FIG. 1. FIG. 1 depicts a television receiver 100 capable of processing (e.g. filtering, amplifying and demodulating) both modulated analog and modulated digital television signals. The receiver 100 accomplishes this by processing the modulated digital television signals and the modulated analog television signals separately. The receiver 100 includes a single tuner 110 with an Intermediate Frequency (IF) output 112 connected to two essentially separate signal paths: a digital demodulation signal path for digital 8-level Vestigial Sideband (8-VSB)/Quadrature Amplitude Modulation (QAM) reception and an analog demodulation signal path for analog video and audio reception. As depicted, the digital demodulation path includes one or two Surface Acoustic Wave (SAW) filters 120 coupled to the tuner 110, an Intermediate Frequency (IF) amplifier 130 coupled to the one or two SAW filters 120, and an 8-level Vestigial Sideband/Quadrature Amplitude Modulation (8-VSB/QAM) demodulator 140 coupled to the IF amplifier 130. The IF amplifier 130 is controlled by the 8-VSB/QAM demodulator 140 with an IF Automatic Gain Control (AGC) signal 116. As depicted, the analog demodulation path includes a video SAW filter 160 coupled to the tuner 110, an audio SAW filter 170 coupled to the tuner 110, a National Television System Committee (NTSC) demodulator 180 coupled to both the video SAW filter 160 and the audio SAW filter 170, and a stereo decoder 190 coupled to the NTSC demodulator. A Radio Frequency (RF) AGC switch 150 controls the tuner 110 with AGC signals 114 from both the 8-VSB/QAM demodulator 140 and the NTSC demodulator 180, thereby determining the tuner AGC characteristics depending on the specific channel reception requirements.

SUMMARY OF INVENTION

Applicants have appreciated that the design of conventional television receivers, such as that depicted in FIG. 1 has several disadvantages. The design is costly in that it requires the use of separate analog and digital data paths, separate 8-VSB/QAM and NTSC demodulators and multiple SAW filters. The design is also complex in that the use of separate demodulators and separate data paths requires more complex hardware and software systems including the use of an RF AGC switch. The use of separate demodulators also results in a mutual negative performance impact between the two demodulators as a result of noise between the different components of the demodulators. Finally, the receiver 100 as depicted in FIG. 1 includes fixed filters which are not capable of adapting to changes in the input signal.

In accordance with the present invention, disadvantages associated with separate analog and digital signal paths and multiple demodulators within a television receiver are reduced by providing a television receiver capable of processing (e.g. filtering, amplifying and demodulating) both modulated analog and modulated digital television signals using a single signal path.

In accordance with one aspect of the present invention, a television receiver is provided. The television receiver comprises a tuner, a bandpass filter, an intermediate frequency amplifier and a demodulator. The tuner has an input to receive radio frequency signals that include modulated analog television signals and modulated digital television signals, and an output to provide the modulated analog television signals and the modulated digital television signals at an intermediate frequency. The bandpass filter is coupled to the intermediate frequency amplifier and has an input coupled to the output of the tuner. The intermediate frequency amplifier has an output. The bandpass filter and the intermediate frequency amplifier provide a singular signal path to filter and amplify both the modulated analog television signals and the modulated digital television signals at the intermediate frequency. The demodulator has a singular input coupled to the output of the intermediate frequency amplifier and a plurality of outputs. The plurality of outputs includes a first output to provide demodulated analog television signals in response to the output of the tuner providing modulated analog television signals at the intermediate frequency and a second output to provide demodulated digital television signals in response to the output of the tuner providing modulated digital television signals at the intermediate frequency.

In accordance with one embodiment, the demodulator includes an automatic gain controller coupled to the tuner and the intermediate frequency amplifier. The automatic gain controller provides a first gain control signal to the tuner to control a gain of the tuner and provides a second gain control signal to the intermediate frequency amplifier to control a gain of the intermediate frequency amplifier. In a further embodiment, the first and second gain control signals are based upon a signal strength indication provided by the tuner and a peak signal level of video portions of the modulated analog television signals in response to the output of the tuner providing modulated analog television signals at the intermediate frequency and are based upon the signal strength indication provided by the tuner and an energy level of the modulated digital television signals in response to the output of the tuner providing modulated digital television signals at the intermediate frequency.

In accordance with another embodiment, the demodulator further includes an analog to digital converter coupled to the output of the intermediate frequency amplifier and a high pass filter coupled to the analog to digital converter having an output. The automatic gain controller provides the first gain control signal to the tuner and the second gain control signal to the intermediate frequency amplifier based upon a signal strength indication provided by the tuner and an energy level of digital signals at the output of the high pass filter in response to the output of the tuner providing modulated digital television signals at the intermediate frequency.

In accordance with another embodiment, the demodulator further includes a tunable bandpass filter having an input, coupled to the output of the high pass filter, and an output. The demodulator further includes a tunable notch filter having an input coupled to the output of the tunable bandpass filter, and an output. The automatic gain controller provides the first gain control signal to the tuner and the second gain control signal to the intermediate frequency amplifier based upon the signal strength indication provided by the tuner and a peak signal level of digital signals at the output of the tunable notch filter in response to the output of the tuner providing modulated analog television signals at the intermediate frequency.

In accordance with another embodiment, the demodulator further includes a first automatic gain control circuit having an input coupled to the output of the tunable notch filter, and an output. The demodulator further includes a single demodulator coupled to the output of the first automatic gain control circuit to provide demodulated digital video signals in response to the output of the tuner providing modulated analog television signals at the intermediate frequency and to provide demodulated digital audio-video signals in response to the output of the tuner providing modulated digital television signals at the intermediate frequency.

In accordance with another embodiment, a gain of the first automatic gain control circuit is controlled based upon a peak signal level of the demodulated digital video signals in response to the output of the tuner providing modulated analog television signals at the intermediate frequency. A gain of the first automatic gain control circuit is controlled based upon an energy level of the demodulated digital audio-video signals in response to the output of the tuner providing modulated digital television signals at the intermediate frequency.

In accordance with another aspect of the present invention, a method of receiving television signals is provided. The method comprises acts of receiving radio frequency signals that include modulated analog television signals and modulated digital television signals and providing a selected one of the modulated analog television signals and the modulated digital television signals at an intermediate frequency. The method further comprises filtering, amplifying, and demodulating the selected one of the modulated analog television signals and the modulated digital television signals provided at the intermediate frequency according to a first set of configuration parameters using a first demodulation signal path in response to the selected one of the modulated analog television signals and the modulated digital television signals at the intermediate frequency being a modulated analog television signal at the intermediate frequency, and filtering, amplifying, and demodulating the selected one of the modulated analog television signals and the modulated digital television signals provided at the intermediate frequency according to a second set of configuration parameters using the first demodulation signal path in response to the selected one of the modulated analog television signals and the modulated digital television signals at the intermediate frequency being a modulated digital television signal at the intermediate frequency.

In accordance with one embodiment, the acts of receiving radio frequency signals that include modulated analog television signals and modulated digital television signals and providing a selected one of the modulated analog television signals and the modulated digital television signals at an intermediate frequency are performed by a tuner. In accordance with this embodiment, the method further comprises controlling a gain of the tuner based upon a peak signal level of video portions of the modulated analog television signal at the intermediate frequency in response to the tuner providing the modulated analog television signal at the intermediate frequency, and controlling the gain of the tuner based upon an energy level of the modulated digital television signal at the intermediate frequency in response to the tuner providing the modulated digital television signal at the intermediate frequency.

In accordance with another embodiment, the act of amplifying includes acts of receiving, at an intermediate frequency amplifier, the selected one of the modulated analog television signal at the intermediate frequency and the modulated digital television signal at the intermediate frequency, and amplifying the selected one of the modulated analog television signal at the intermediate frequency and the modulated digital television signal at the intermediate frequency based upon a gain control signal. In accordance with one embodiment, the method further comprises acts of controlling the gain of the intermediate frequency amplifier based upon the peak signal level of the video portions of the modulated analog television signal at the intermediate frequency in response to the tuner providing the modulated analog television signal at the intermediate frequency, and controlling the gain of the intermediate frequency amplifier based upon the energy level of the modulated digital television signal at the intermediate frequency in response to the tuner providing the modulated digital television signal at the intermediate frequency.

In accordance with a further embodiment, the act of demodulating can include acts of digitizing the amplified selected one of the modulated analog television signal at the intermediate frequency and the modulated digital television signal at the intermediate frequency to provide digital signals, and filtering the digital signals to remove any bias generated during the act of digitizing. In accordance with yet a further embodiment, the act of demodulating may further include acts of removing audio information from the digital signals to provide video-only digital signals and demodulating the video-only digital signals using a first demodulator to provide demodulated analog video television signals in response to the to the tuner providing the modulated analog television signal at the intermediate frequency, and demodulating the digital signals using the first demodulator to provide an MPEG transport stream in response to the tuner providing the modulated digital television signal at the intermediate frequency.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
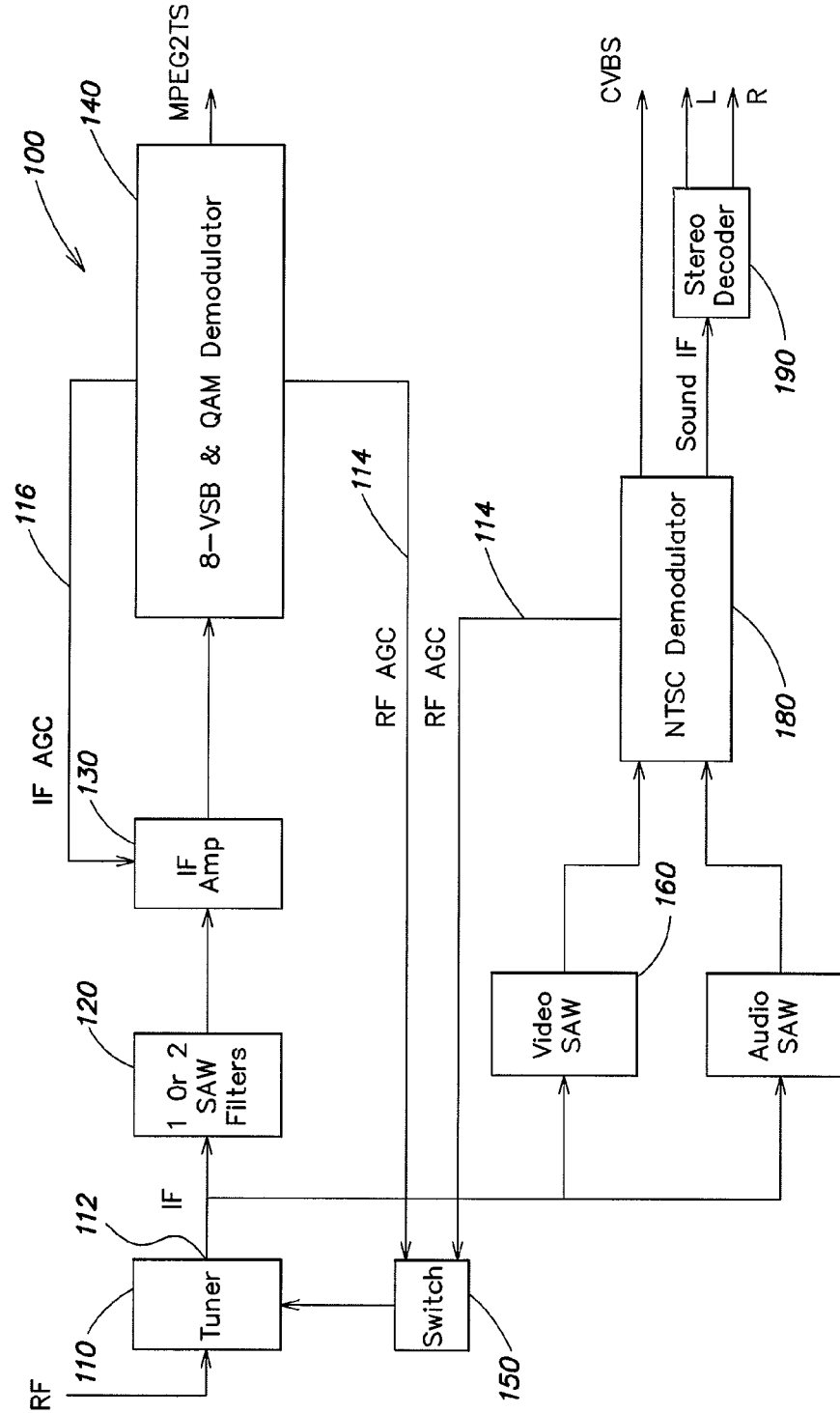
FIG. 1 is a block diagram of a conventional television receiver that includes separate analog and digital demodulation signal paths.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The use of separate digital and analog signal paths and multiple demodulators within a television receiver results in increased cost and complexity, and diminished performance and flexibility. Embodiments of the present invention are directed to a television receiver capable of processing (e.g. filtering, amplifying, demodulating, or combinations thereof) both modulated analog and modulated digital television signals using a singular signal path. The use of a singular signal path instead of separate analog and digital paths results in a less costly, less complex, more flexible, and improved performance television receiver.

Figure 2:
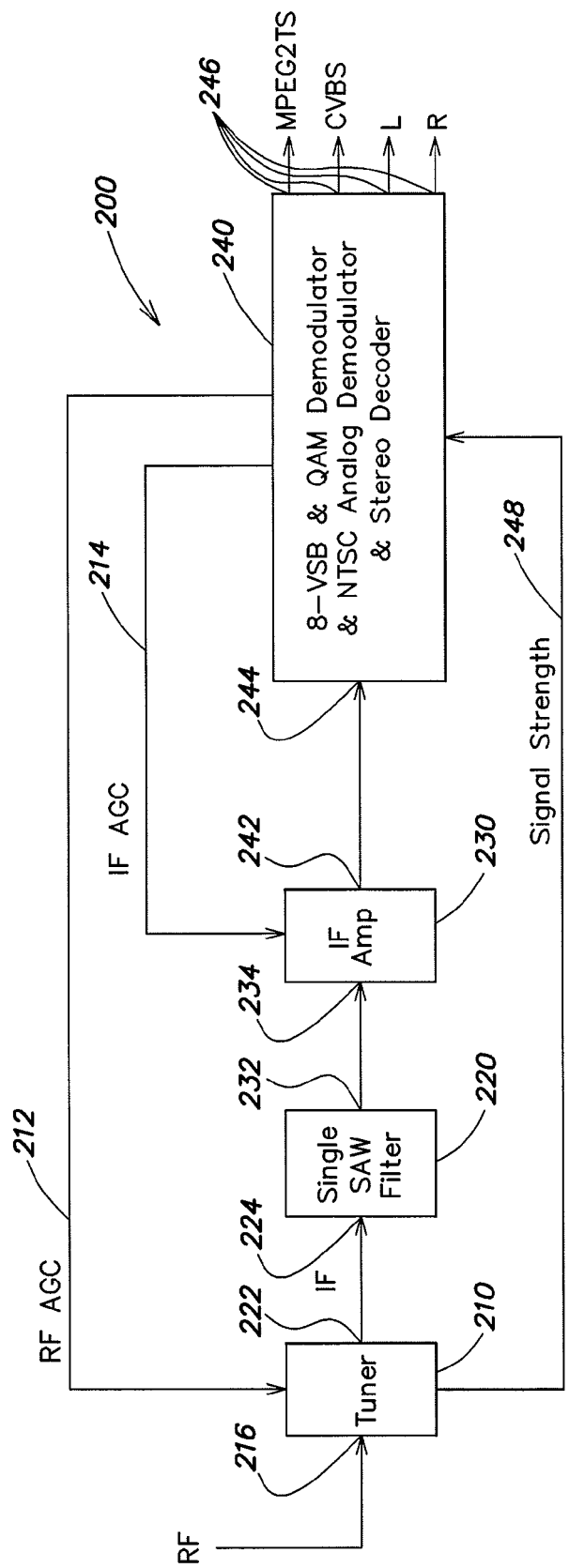
FIG. 2 is a block diagram of a television receiver that includes a single demodulation signal path and a single analog/digital television signal demodulator according to an embodiment of the present invention.

Referring to FIG. 2, there is shown a block diagram of a television receiver according to an embodiment of the present invention, referenced generally by reference numeral 200. The receiver 200 includes a tuner 210, a SAW type bandpass filter 220, an Intermediate Frequency (IF) amplifier 230 and an 8-VSB/QAM/Analog demodulator 240. The tuner 210 is configured to receive Radio Frequency (RF) signals including both modulated analog television signals and modulated digital television signals at an input 216 and to provide modulated analog television signals at an intermediate frequency and modulated digital television signals at an intermediate frequency to an output 222. The SAW type bandpass filter 220 has an input 224 coupled to the output 222 of the tuner 210 and is configured to filter the modulated analog or digital television signals at the intermediate frequency received from the tuner 210 and to provide filtered modulated analog or digital television signals at the intermediate frequency to an output 232. The Intermediate Frequency (IF) amplifier 230 has an input 234 coupled to the output 232 of the bandpass filter 220 and is configured to amplify the filtered modulated analog or digital television signals at the intermediate frequency received from the bandpass filter 220 and to provide filtered and amplified modulated analog or digital television signals at the intermediate frequency to an output 242. The 8-VSB/QAM/Analog demodulator 240 has an input 244 coupled to the output 242 of the IF amplifier and is configured to demodulate the filtered and amplified modulated analog or digital television signals at the intermediate frequency received from the IF amplifier 230 and to provide demodulated analog and digital television signals to a plurality of outputs 246. The demodulator 240 is configured to control the gain of the tuner 210 with an RF AGC signal 212 and is also configured to control the gain of the IF amplifier with an IF AGC signal 214. In one embodiment, the demodulator 240 may also be configured to receive a signal strength indicator 248 from the tuner 210 responsive the strength of the RF signal currently being received by the tuner 210 at the input 216. In another embodiment, the television receiver 200 may also include multiple SAW type bandpass filters coupled between the tuner 210 and the IF amplifier 230 and configured to filter the modulated analog television signals and the modulated digital television signals at the intermediate frequency.

Figure 3:
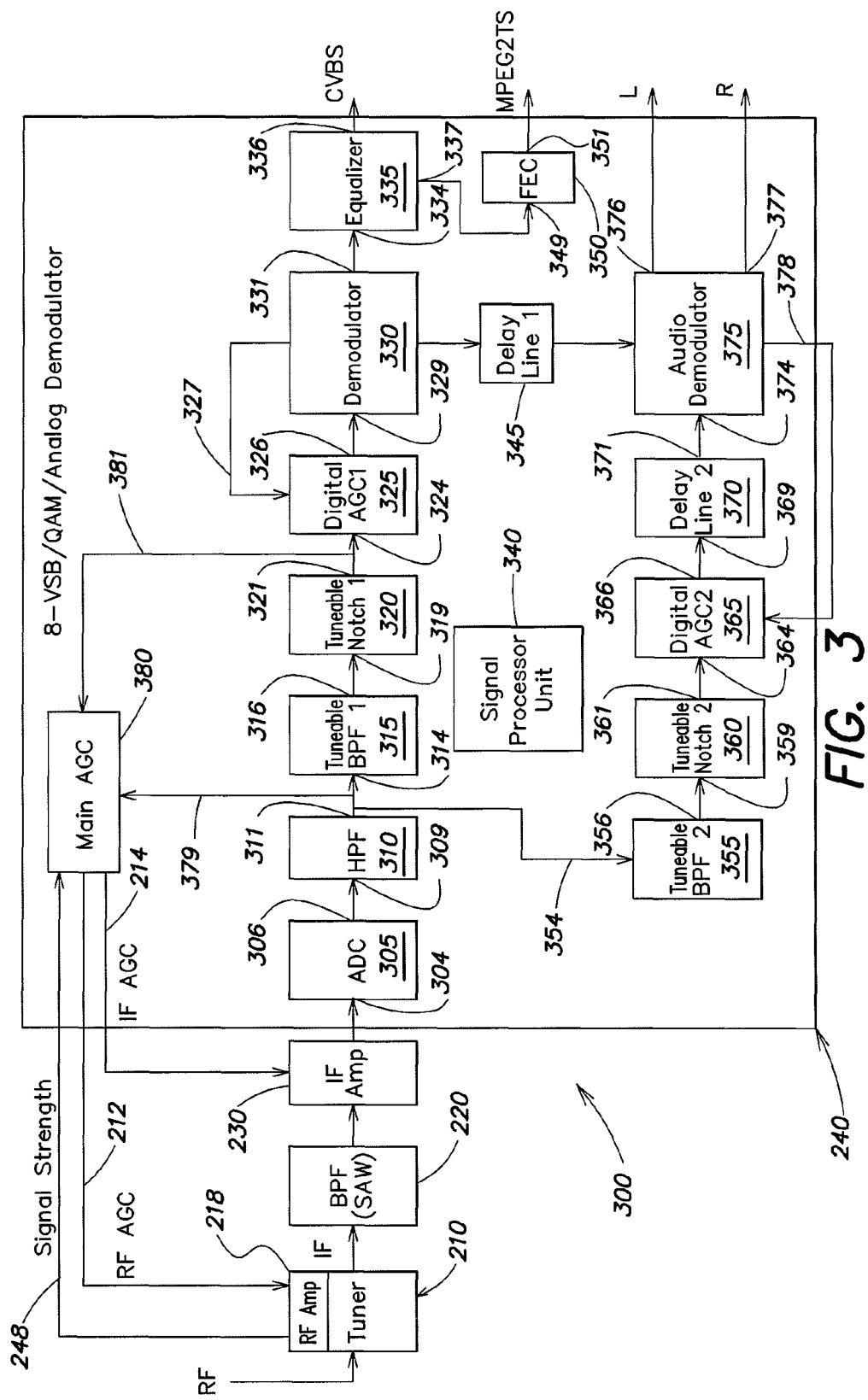
FIG. 3 is a more detailed block diagram of the television receiver of FIG. 2.

Referring to FIG. 3, there is shown a block diagram of the television receiver 300 including a more detailed view of the 8-VSB/QAM/Analog demodulator 240 in accordance with an embodiment of the present invention. In this embodiment, the tuner 210 includes an RF amplifier 218 which is controlled by the RF AGC signal 212 from the demodulator 240. As previously described with respect to FIG. 2, the tuner 210 is configured to provide modulated analog television signals at an intermediate frequency and modulated digital television signals at an intermediate frequency at the output 222 of the tuner 210. In FIG. 2, a single signal path that includes bandpass filter 220 and IF amplifier 230 is used to filter and amplify both the modulated analog television signals and the modulated digital television signals.

As shown in FIG. 3, the demodulator 240 includes an analog to digital converter (ADC) 305 having an input 304 coupled to the output 242 of the IF amplifier 230 and a high pass filter 310 having an input 309 coupled to the output 306 of the ADC 305. The ADC 305 is configured to convert the filtered and amplified modulated analog or digital television signals at the intermediate frequency received from the IF amplifier 230 into digital signals corresponding to the filtered and amplified modulated analog or digital television signals at the intermediate frequency at the output 306. The high pass filter 310 is configured to remove any ADC bias from the digital signals received from the ADC 305.

The demodulator 240 further includes a first tunable band pass filter 315 having an input 314 coupled to the output 311 of the high pass filter 310 and a first tunable notch filter 320 having an input 319 coupled to the output 316 of the first tunable bandpass filter 315. The first tunable bandpass filter 315 is configured to remove residual adjacent channel interferences from the digital signals received from the high pass filter 310. In response to the RF signals selected by the tuner 210 being modulated digital television signals, the first tunable notch filter 320 is configured (for example, by the signal processor unit 340) to remove the N-1 audio carrier from the digital signal received from the first tunable bandpass filter 315. In response to the RF signals selected by the tuner 210 being modulated analog television signals, the first tunable notch filter 320 is configured to remove the audio carrier from the digital signal received from the first tunable bandpass filter 315 and to provide a video-only digital signal at the output 321.

The demodulator 240 further includes a main AGC controller 380 configured to control the gain of both the tuner 210 and the IF amplifier 230. In the depicted embodiment, the main AGC controller 380 provides an RF AGC signal 212 to the RF amplifier 218 of the tuner 210 to control the gain of the RF amplifier 218 and also provides an IF AGC signal 214 to the IF amplifier 230 to control the gain of the IF amplifier 230. In response to the RF signals selected by the tuner 210 being modulated digital television signals, the main AGC controller 380 provides the RF AGC signal and the IF AGC signal responsive to the digital signals at the output 311 of the high pass filter 310. In response to the RF signals selected by the tuner 210 being modulated analog television signals, the main AGC controller 380 provides the RF AGC signal and the IF AGC signal responsive to the video-only digital signal at the output 321 of the first tunable notch filter 320. In one embodiment, the main AGC controller 380 also receives a signal strength indicator 248 from the tuner responsive to the strength of the RF signal received by the tuner 210 and uses this signal strength indicator to generate the RF AGC signal 212 and the IF AGC signal 214.

As shown, the demodulator 240 further includes a first digital AGC circuit 325 having an input 324 coupled to the output 321 of the first tunable notch filter 320, and a demodulator 330 having an input 329 coupled to the output 326 of the first digital AGC circuit 325. The first digital AGC circuit 325 is configured to bring the signal received from the output 321 of the first tunable notch filter to a desired level responsive to a feedback signal 327 from the demodulator 330. The demodulator 330 is configured to provide a demodulated baseband signal at the output 331 and to provide the feedback signal 327 to the first digital AGC circuit 325 responsive to the signal level of the demodulated baseband signal.

The demodulator 240 further includes an equalizer 335 having an input 334 coupled to the output 331 of the demodulator 330 and a Forward Error Correction (FEC) unit 350 having an input 349 coupled to an output 337 of the equalizer 335. The equalizer 335 is configured to equalize the demodulated baseband signal from the demodulator 330. In response to the RF signals selected by the tuner 210 being modulated digital television signals, the FEC provides a Moving Picture Expert Group Transport Stream (MPEGTS) to the output 351 which includes both video and audio information. In response to the RF signals selected by the tuner 210 being modulated analog television signals, the equalizer 335 provides Composite Video Baseband Signals (CVBS) to the output 336.

As depicted in FIG. 3, the demodulator 240 further includes a second tunable bandpass filter 355 having an input 354 coupled to the output 311 of the high pass filter 310, and a second tunable notch filter 360 having an input 359 coupled to the output 356 of the second tunable bandpass filter 355. In response to the RF signals selected by the tuner 210 being modulated analog television signals, the second tunable bandpass filter 355 removes the video carrier from the digital signals received from the high pass filter 310 and provides an audio-only digital signal to the output 356 of the second tunable bandpass filter 355. The second tunable notch filter 360 is configured to remove adjacent carrier interferences from the audio-only digital signal received from the second tunable bandpass filter 355.

The demodulator 240 further includes a second digital AGC circuit 365 having an input 364 coupled to the output 361 of the second tunable notch filter 360. The second digital AGC circuit 365 is configured to bring the audio-only digital signal received from the second tunable notch filter 360 to a desired level responsive to the signal strength of the audio-only digital signal provided by the audio demodulator 375. A first delay line 345 is coupled between the demodulator 330 and the audio demodulator 375, and a second delay line 370 is coupled between the second digital AGC circuit 365 and the audio demodulator 375. The audio demodulator 375 has an input 374 coupled to the output 371 of the second delay line 370 and is configured to demodulate the audio-only digital signals and to provide a left audio signal at an output 376 and a right audio signal at an output 377. The audio demodulator 375 uses the frequency of the demodulated base-band video signal from the demodulator 330 to perform the audio demodulation. The first delay line 345 and the second delay line 370 provide for any necessary synchronization between the CVBS signal at the output 336 and the left and right audio signals at outputs 376, 377.

The operation of the television receiver 300 will now be described with reference to FIG. 3. The tuner 210 receives RF signals that may include either modulated analog television signals or modulated digital television signals. The television receiver's 300 operation varies dependent on which of these RF signals are selected by the tuner 210, with the operation of the television receiver being described first with respect to modulated analog television signals.

Modulated Analog Television Signals

The tuner 210 of the television receiver 300 receives RF signals and selects or separates out either modulated analog television signals or modulated digital television signals from the RF signals based upon some selection criteria (e.g., a particular channel selected by a user) by the tuner 210. In response to selection of modulated analog television signals, the modulated analog television signal is amplified (or attenuated) by the RF amplifier 218 of the tuner 210 to produce a modulated analog television signal at an intermediate frequency. The gain of the RF amplifier 218 is controlled by the main AGC controller 380, which provides the RF AGC signal 212 to the RF amplifier 218. The modulated analog television signal at the intermediate frequency is provided to the SAW type bandpass filter 220 to remove adjacent channel interferences and produce a filtered modulated analog television signal at the intermediate frequency. In one embodiment, the SAW type bandpass filter 220 may have a 6 MHz channel bandwidth. The filtered modulated analog television signal at the intermediate frequency is provided to the IF amplifier 230, wherein it is amplified and provided to the demodulator 240 as a filtered and amplified modulated analog television signal at the intermediate frequency. The gain of the IF amplifier 230 is controlled by the main AGC controller 380 which provides the IF AGC signal 214 to the IF amplifier 230. The filtered and amplified modulated analog television signal at the intermediate frequency is sub-sampled by the ADC 305 to convert the filtered and amplified modulated analog television signal at the intermediate frequency into a digital signal corresponding to the filtered and amplified modulated analog television signal at the intermediate frequency. In one embodiment, the ADC 305 may be a high resolution ADC of 12 bits or higher. Any ADC bias is removed from the digital signal by the high pass filter 310. The digital signal output by the high pass filter 310 is provided to the first tunable band pass filter 315 to remove residual adjacent channel interference and perform vestigial filtering around the video carrier. The filter coefficients of the first tunable band pass filter 315 can be adjusted by the signal processor unit 340 in response to carrier information provided by the demodulator 330, as discussed in more detail below.

As known to those skilled in the art, a modulated analog television signal received by the tuner 210 includes both video information (a video carrier) and audio information (an audio carrier). In modulated analog television signals, the audio carrier may be quite strong and may overwhelm the video carrier. Because of this, and to better demodulate the modulated analog television signals, the audio and video carriers may be processed separately. The audio carrier is removed from the digital signal by the first tunable notch filter 320. The filter coefficients of the first tunable notch filter 320 can be adjusted by the signal processor unit 340 in response to carrier information from the demodulator 330, as discussed in more detail below.

The main AGC controller 380, which as discussed above controls the gain of both the RF amplifier 218 and the IF amplifier 230, provides the RF AGC signal 212 and the IF AGC signal 214 based on the video-only digital signal provided by the first tunable notch filter 320 and the strength of the RF signal received at the tuner 210 (e.g., as indicated by signal strength indicator 248). In accordance with one embodiment, the main AGC controller 380 uses a peak detector to track the input signal level. In one embodiment the peak detector uses smart gating techniques and uses only a portion of the input RF signal that is consistent and repetitive to calibrate the peak detector measurements. In this embodiment, peak detection is based on the horizontal synchronization signal embedded in the modulated analog television signal.

In an alternative embodiment, instead of being controlled by the RF AGC signal 212 from the main AGC controller 380, the gain of the RF amplifier 218 may be controlled by the tuner itself for both modulated analog television signals and modulated digital television signals. For example, the gain of the RF amplifier 218 may be adjusted based on gain values stored in configurable registers that can be accessed by the RF amplifier. The configurable registers can be used to store different gain values for use by the RF amplifier depending on whether the RF signals received by the tuner 210 are determined to be modulated analog television signals or modulated digital television signals.

The video-only digital signal is brought to a desired level by the first digital AGC circuit 325. The first digital AGC circuit 325 performs fast tracking of signal level changes by receiving a feedback signal 327 from a peak detector sensor in the demodulator 330. In one embodiment, the first digital AGC circuit 325 may also be used to reduce the data precision of the video-only digital signal. For example, the data precision of the video-only digital signal may be reduced from 12 bits to 10 bits. The demodulator 330 demodulates the video-only digital signal to a demodulated baseband video signal and provides the feedback signal 327 to the first digital AGC circuit 325 from a peak detector within the demodulator 330 which is responsive to the demodulated baseband video signal. In one embodiment, the demodulator 330 uses a picture carrier recovery circuit to estimate and compensate for frequency and phase differences. The demodulated base-band video signal can be further equalized with the equalizer 335 to get the desired frequency response with flat group delay. The equalizer 335 outputs the composite video baseband signal (CVBS).

The digital signal from the high pass filter 310 is also provided to the second tunable bandpass filter 355 that removes the video carrier from the digital signal received from the high pass filter 310. The second tunable notch filter 360 is used to remove adjacent carrier interferences from the audio-only digital signal received from the second tunable bandpass filter 355. The filter coefficients of the second tunable band pass filter 355 and the second tunable notch filter 360 can be adjusted by the signal processor unit 340 in response to carrier information from the audio demodulator 375, as discussed in more detail below.

The second digital AGC circuit 365 brings the audio-only digital signal to a desired reference level. In one embodiment, the second digital AGC circuit 365 brings the audio-only digital signal to a desired reference level based on a feedback signal 378 from an energy detector in the audio demodulator 375. In one embodiment, the second digital AGC circuit 365 can also be used to reduce the data precision of the audio only digital signal. For example, the second digital AGC circuit 365 may be used to reduce the data precision of the audio only digital signal from 12 bits to 10 bits. The audio demodulator 375 demodulates the audio-only digital signal to provide demodulated baseband audio signals including left and right audio signals which may be provided to corresponding speakers (not shown). The audio demodulator 375 also provides the feedback signal 378 to the digital AGC 365 from an energy detector within the audio demodulator 375 responsive to an energy level of the demodulated baseband audio signals. The audio demodulator 375 uses the frequency of the demodulated baseband video signal from the demodulator 330 to perform the audio demodulation. The first delay line 345 and the second delay line 370 provide for any necessary synchronization between the CVBS signal and the left and right audio signals.

Modulated Digital Television Signals

As known to those skilled in the art, modulated digital television signals received by the tuner 210 may include, but are not limited to, signals such as 8-level Vestigial Sideband (8-VSB) and Quadrature Amplitude Modulation (QAM) digital signals. 8-VSB is the 8-level vestigial sideband modulation method adopted for terrestrial (over the air) broadcast of the Advanced Television Systems Committee (ATSC) digital television standard in the United States. QAM is the format by which digital cable channels are encoded and transmitted via cable.

In response to selection of modulated digital television signals by the tuner, the selected modulated digital television signal is amplified (or attenuated) by the RF amplifier 218 of the tuner 210 to produce a modulated digital television signal at an intermediate frequency. The gain of the RF amplifier 218 is controlled by the main AGC controller 380, which provides the RF AGC signal 212 to the RF amplifier 218. The modulated digital television signal at the intermediate frequency is provided to the SAW type bandpass filter 220 to remove adjacent channel interferences and produce a filtered modulated digital television signal at the intermediate frequency. As noted previously, the bandpass filter 220 may have a 6 MHz channel bandwidth.

The filtered modulated digital television signal at the intermediate frequency is provided to the IF amplifier 230. The gain of the IF amplifier 230 is controlled by the main AGC controller 380 of the demodulator 240 which provides the IF AGC signal 214 to the IF amplifier 230. The filtered and amplified modulated digital television signal at the intermediate frequency provided by the IF amplifier 230 is sub-sampled by the ADC 305 to convert the filtered and amplified modulated digital television signal at the intermediate frequency into a digital signal corresponding to the filtered and amplified modulated digital television signal at the intermediate frequency. As noted previously, the ADC 305 may be a high resolution ADC of 12 bits or higher.

Any ADC bias is removed from the digital signal received from the ADC 305 by the high pass filter 310. The digital signal at the output 311 of the high pass filter 310 is provided to the first tunable band pass filter 315 to remove residual adjacent channel interferences. The N-1 adjacent audio carrier is removed from the digital signal by the first tunable notch filter 320. The filter coefficients of the first tunable band pass filter 315 and the first tunable notch filter 320 can be adjusted by the signal processor unit 340 in response to carrier information from the demodulator 330, as discussed in more detail below.

The main AGC controller 380, which as discussed above controls both the gain of the RF amplifier 218 and the IF amplifier 230, provides the RF AGC signal 212 and IF AGC signal 214 based on the digital signal after the high pass filter 310 and the strength of the RF signal received at the tuner 210 (e.g., as indicated by signal strength indicator 248). In accordance with one embodiment, the main AGC controller 380 uses an energy detector to track the input energy level.

As noted previously, in an alternative embodiment, instead of being controlled by the RF AGC signal 212 from the main AGC controller 380, the gain of the RF amplifier 218 may be controlled by the tuner itself for both modulated analog television signals and modulated digital television signals. For example, the gain of the RF amplifier 218 may be adjusted based on configurable registers that store different gain values to be used by the RF amplifier 218 depending on whether the RF signals received by the tuner 210 are modulated analog television signals or modulated digital television signals.

The digital signal after the first tunable notch filter 320 is brought to a desired level by the first digital AGC circuit 325. The first digital AGC circuit 325 performs fast tracking of signal level changes by receiving a feedback signal 327 from an energy detector in the demodulator 330. In one embodiment, the first digital AGC circuit 325 may also be used to reduce the data precision of the video-only digital signal. For example, the data precision of the video-only digital signal may be reduced from 12 bits to 10 bits. The demodulator 330 demodulates the digital signal to a demodulated baseband signal and provides the feedback signal 327 to the first digital AGC circuit 325 from an energy detector within the demodulator 330 which is responsive to an energy level of the demodulated baseband signal. The baseband signal can be further equalized with the equalizer 335. After equalization, the baseband signal is processed by the FEC 350 to correct any errors and a Moving Picture Expert Group Transport Stream (MPEGTS) is provided at the output 351. Unlike analog television signals in which video and audio are handled separately (i.e. CVBS, Left and Right Audio); the produced MPEG transport stream includes both video and audio information. The MPEG transport stream may be provided to an MPEG decoder, not shown.

Figure 4:
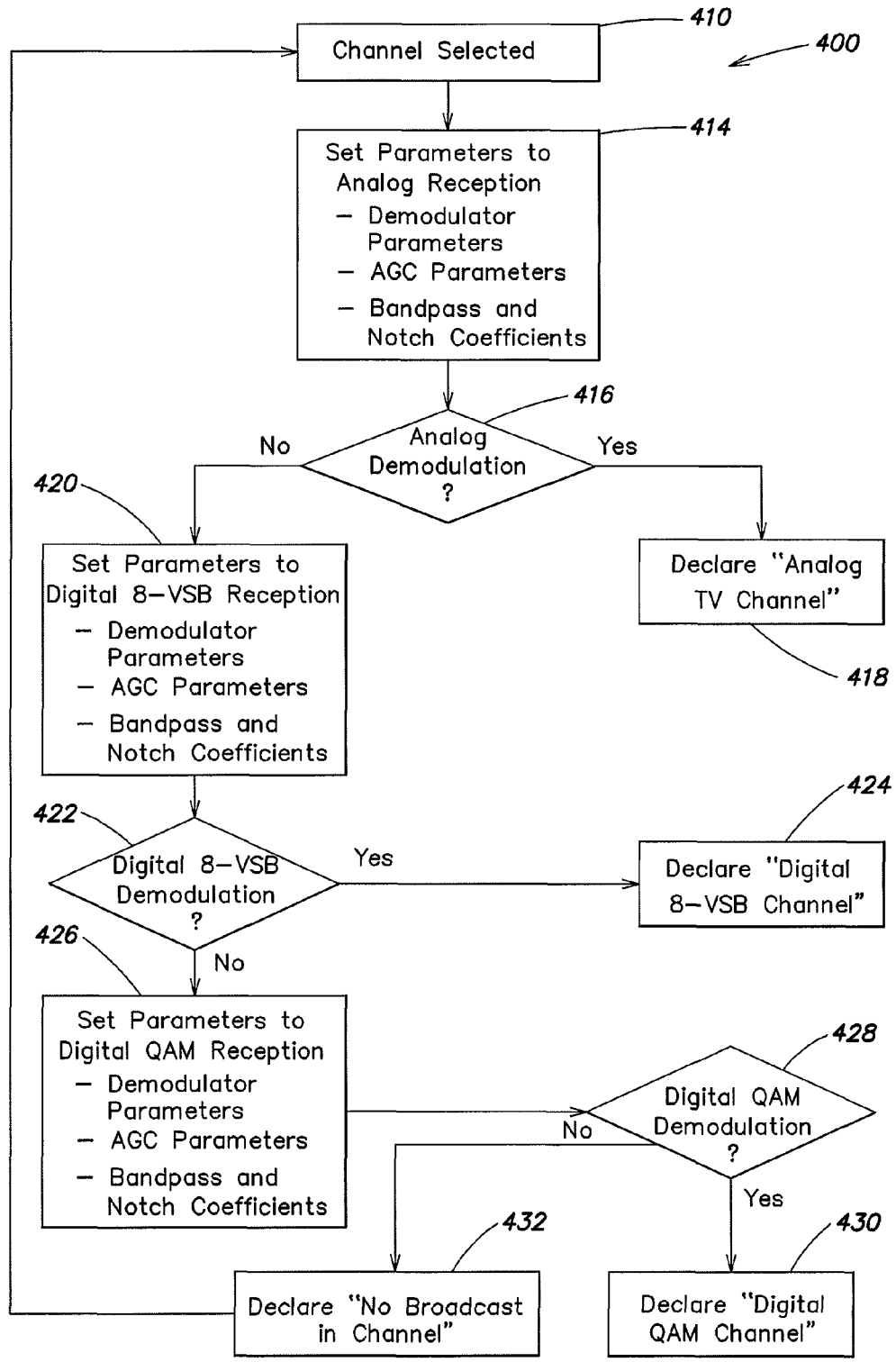
FIG. 4 is a flow chart of a method of operation of the television receiver of FIGS. 2-3.

FIG. 4 is a flow chart 400 of a method of operation of the television receiver of FIGS. 2-3. The method may be executed under the control of the signal processor unit 340 which can communicate with demodulators 330 and 375 and with each of the tunable filters 315, 320, 355, 360, to adjust filter coefficients based on whether the selected signal is a modulated analog television signal, a modulated digital 8-VSB television signal or a modulated digital QAM television signal. In another embodiment, the filter coefficients of the tunable filters 315, 320, 355, 360 may be further adjusted based on additional carrier information from the demodulators 330, 375. For example, if a strong adjacent channel signal is present at the demodulator 330, 375, the coefficients of the tunable filter 315, 320, 355, 360 may be adjusted to further attenuate the adjacent channel signal thus improving the reception of the selected channel.

At block 410, a channel is selected and the frequency of the tuner 210 is set to receive the signal of the selected channel. The channel may be selected manually by tuning the receiver to a specific channel's frequency, by scrolling through the channels available to the receiver, etc. At block 414, the parameters of the receiver 200, 300 are set by the signal processor unit 340 for analog television signal reception. For example, in block 414, parameters that may be set may include, but are not limited to, the demodulator parameters (e.g. whether the sensor used by a demodulator is a peak sensor or an energy sensor), AGC parameters (e.g., whether the sensor used by an AGC is a peak sensor or an energy sensor, or which signals received by the main AGC 380 will be used to generate the RF AGC signal and the IF AGC signal), bandpass filter coefficients, and notch filter coefficients. In response to the gain of the RF amplifier 218 being controlled by the tuner itself, the configurable registers used to store gain values for the tuner may be set to values appropriate for modulated analog television signal reception.

At block 416, a determination is made as to whether the demodulation is successful with the analog television signal settings. In response to a determination that the demodulation was successful with the analog television settings, at block 418, the selected channel is identified as an analog television channel and the demodulation of the selected channel as an analog television channel continues. In one embodiment, at block 418, the identification of the channel and its corresponding parameters may be saved for future use.

Alternatively, at block 420, in response to a determination that the demodulation was not successful with the analog television settings, the parameters of the television receiver are set by the signal processor unit 340 to digital 8-VSB reception. At block 422, a determination is made as to whether the demodulation is successful with the digital 8-VSB settings. In response to a determination that the demodulation was successful with the 8-VSB settings, at block 424, the selected channel is identified as a digital 8-VSB channel and the demodulation of the selected channel as a digital 8-VSB channel continues. In one embodiment, at block 424, the identification of the channel and its corresponding parameters may be saved for future use.

At block 426, in response to a determination that the demodulation was not successful with the digital 8-VSB settings, the parameters of the television receiver are set by the signal processor unit 340 to digital QAM reception. At block 428, a determination is made as to whether the demodulation is successful with the digital QAM settings. In response to a determination that the demodulation was successful with the QAM settings, at block 430, the selected channel is identified as a digital QAM channel and the demodulation of the selected channel as a digital QAM channel continues. In one embodiment, at block 430, the identification of the channel and its corresponding parameters may be saved for future use.

At block 432, in response to a determination that the demodulation was not successful with the digital QAM settings, the channel may either be saved with an indication that there is no broadcast at that channel or the process 400 may be started again. The process 400 shown in FIG. 4 may be performed until the selected channel is identified as an analog, digital 8-VSB or digital QAM signal, or a second channel is selected to be demodulated. The process 400 may be performed for each channel available to the television receiver. In one embodiment, the signal processor unit 340 may automatically scan through each channel available to the receiver and perform the process 400 for each channel. The signal processor unit 340 may identify the demodulation required, if any, for each channel and save the identification and corresponding parameters for each channel In one embodiment, the process may be performed entirely on one integrated circuit (IC) chip.

It should be appreciated that blocks of method 400 may be performed in a different order than that depicted in FIG. 4, as the present invention is not limited to the specific order shown in FIG. 4. For example, the receiver 200, 300 may first test the selected channel for digital 8-VSB signals, then analog signals and finally digital QAM signals. It should also be appreciated that alternative embodiments of the receiver 200, 300 need not test for all three signal formats. For example, the receiver 200, 300 may only test the selected channel for digital QAM signals and analog signals, or for digital 8-VSB signals and digital QAM signals.

Table 1 below provides a brief summary of the previously described manner of operation of the television receiver of FIGS. 2-3.

TABLE 1

| Element | Analog Signals | Digital Signals | Configuration |
| --- | --- | --- | --- |
| Tuner (210) | Receive both video & audio signal | Receives VSB/QAM modulated signal | |
| BPF (220) | A SAW type band-pass filter –6 MHz channel to remove adjacent channels | A SAW type band-pass filter –6 MHz channel to remove adjacent channels | |

TABLE 1-continued

| Element | Analog Signals | Digital Signals | Configuration |
|---|---|---|---|
| IF Amplifier (230) | An intermediate frequency amplifier controlled by AGC 380 | An intermediate frequency amplifier controlled by AGC 380 | |
| ADC (305) | Sub-sampling by a high-resolution ADC (12-bit or more) | Sub-sampling by a high-resolution ADC (12-bit or more) | |
| HPF (310) | Removes bias added by ADC 305 | Removes bias added by ADC 305 | |
| Tunable BPF 1 (315) | A band pass vestigial filter designed to remove remaining adjacent channel interference | A band pass filter designed to remove remaining adjacent channel interference | |
| Tunable Notch 1 (320) | Removal of the audio carrier Brings the signal to a desired reference level and does fast tracking of signal level changes | Removes of the N-1 adjacent audio carrier Brings the signal to a desired reference level and does fast tracking of signal level changes | Different notch frequency for analog and digital Configure the input signal and the AGC sensor type based on the type of video analog or digital. |
| Digital AGC 1 (325) | | | |
| Demodulator (330) | Demodulates video signal to base band by a picture carrier recovering circuit | Demodulates signal to base band by a VSB/QAM pilot carrier recovering circuit | |
| Equalizer (335) | Controls the frequency response and the group delay of the video base band signal | Equalizes the base band signal and remove channel multipath | |
| FEC (350) | Not applicable | Performs forward error correction and generates MPEG stream | Enable when receiving digital video signal |
| Main AGC (380) | Provides AGC control signals to IF amplifier 230 and Tuner 210 based on the signal after notch filter 320 | Provides AGC control signals to IF amplifier 230 and Tuner 210 based on the signal after high pass filter 310 | Configure the input signal and the AGC sensor type based on the type of video analog or digital. |

Embodiments of the present invention provide a television receiver capable of filtering and amplifying both modulated analog and modulated digital television signals using a singular signal path. This can provide a less costly, less complex, more flexible, and improved performance television receiver. By providing a singular signal path, the cost of the receiver may be reduced because the same SAW type filter(s) can be used for both analog and digital reception. Further, a single demodulator may be used to demodulate both the modulated analog video signal and the modulated digital television signal. Because a majority of the demodulation process is performed in the digital domain after the ADC 305, problems associated with interference such as EMI may be reduced or eliminated.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A television receiver, comprising:
a tuner having an input to receive radio frequency signals that include modulated analog television signals and modulated digital television signals, and an output to provide the modulated analog television signals and the modulated digital television signals at an intermediate frequency;
a bandpass filter coupled to an intermediate frequency amplifier, the bandpass filter having an input coupled to the output of the tuner, and the intermediate frequency amplifier having an output, the bandpass filter and the intermediate frequency amplifier providing a singular signal path to filter and amplify both the modulated analog television signals and the modulated digital television signals at the intermediate frequency; and
a demodulator having a singular input coupled to the output of the intermediate frequency amplifier and having a plurality of outputs, the plurality of outputs including a first output to provide demodulated analog television signals in response to the output of the tuner providing modulated analog television signals at the intermediate frequency and a second output to provide demodulated digital television signals in response to the output of the tuner providing modulated digital television signals at the intermediate frequency, the demodulator including an automatic gain controller coupled to the tuner and the intermediate frequency amplifier and at least one tunable filter having an input coupled to the singular input and an output coupled to the automatic gain controller, the automatic gain controller providing a first gain control signal to the tuner to control a gain of the tuner and providing a second gain control signal to the intermediate frequency amplifier to control a gain of the intermediate frequency amplifier, and the at least one tunable filter configured to filter audio signals from the modulated analog television signals and provide video portions of the modulated analog television signals at the output of the at least one tunable filter;
wherein the first and second gain control signals are based upon a signal strength indication provided by the tuner and a peak signal level of the video portions of the modulated analog television signals at the output of the at least one tunable filter in response to the output of the tuner providing modulated analog television signals at the intermediate frequency, and wherein the first and second gain control signals are based upon the signal strength indication provided by the tuner and an energy level of the modulated digital television signals in response to the output of the tuner providing modulated digital television signals at the intermediate frequency.

2. The television receiver of claim 1, wherein the demodulator further includes:
an analog to digital converter coupled to the output of the intermediate frequency amplifier; and
a high pass filter coupled to the analog to digital converter, the high pass filter having an output;
wherein the automatic gain controller provides the first gain control signal to the tuner and the second gain control signal to the intermediate frequency amplifier based upon a signal strength indication provided by the tuner and an energy level of the modulated digital television signals at the output of the high pass filter in response to the output of the tuner providing modulated digital television signals at the intermediate frequency.

3. A television receiver, comprising:
a tuner having an input to receive radio frequency signals that include modulated analog television signals and modulated digital television signals, and an output to provide the modulated analog television signals and the modulated digital television signals at an intermediate frequency;
a bandpass filter coupled to an intermediate frequency amplifier, the bandpass filter having an input coupled to the output of the tuner, and the intermediate frequency amplifier having an output, the bandpass filter and the intermediate frequency amplifier providing a singular signal path to filter and amplify both the modulated analog television signals and the modulated digital television signals at the intermediate frequency; and
a demodulator having a singular input coupled to the output of the intermediate frequency amplifier and having a plurality of outputs, the plurality of outputs including a first output to provide demodulated analog television signals in response to the output of the tuner providing modulated analog television signals at the intermediate frequency and a second output to provide demodulated digital television signals in response to the output of the tuner providing modulated digital television signals at the intermediate frequency;
wherein the demodulator includes an automatic gain controller coupled to the tuner and the intermediate frequency amplifier, the automatic gain controller providing a first gain control signal to the tuner to control a gain of the tuner and providing a second gain control signal to the intermediate frequency amplifier to control a gain of the intermediate frequency amplifier;
wherein the demodulator further includes an analog to digital converter coupled to the output of the intermediate frequency amplifier and a high pass filter coupled to the analog to digital converter, the high pass filter having an output;
wherein the automatic gain controller provides the first gain control signal to the tuner and the second gain control signal to the intermediate frequency amplifier based upon a signal strength indication provided by the tuner and an energy level of digital signals at the output of the high pass filter in response to the output of the tuner providing modulated digital television signals at the intermediate frequency;
wherein the demodulator further includes a tunable bandpass filter having an input coupled to the output of the high pass filter and having an output; and a tunable notch filter having an input coupled to the output of the tunable bandpass filter and having an output; and
wherein the automatic gain controller provides the first gain control signal to the tuner and the second gain control signal to the intermediate frequency amplifier based upon the signal strength indication provided by the tuner and a peak signal level of at the output of the tunable notch filter in response to the output of the tuner providing modulated analog television signals at the intermediate frequency.

4. The television receiver of claim 3, wherein the demodulator further includes:
a first automatic gain control circuit having an input coupled to the output of the tunable notch filter and having an output; and
a single demodulator coupled to the output of the first automatic gain control circuit to provide demodulated digital video signals in response to the output of the tuner providing modulated analog television signals at the intermediate frequency and to provide demodulated digital audio-video signals in response to the output of the tuner providing modulated digital television signals at the intermediate frequency.

5. The television receiver of claim 4, wherein a gain of the first automatic gain control circuit is controlled based upon a peak signal level of the demodulated digital video signals in response to the output of the tuner providing modulated analog television signals at the intermediate frequency, and wherein the gain of the first automatic gain control circuit is controlled based upon an energy level of the demodulated digital audio-video signals in response to the output of the tuner providing modulated digital television signals at the intermediate frequency.

6. The television receiver of claim 5, wherein the demodulator further includes a signal processor unit, wherein configurable parameters of the tunable bandpass filter and the tunable notch filter are set by the signal processor unit to a first configuration in response to the output of the tuner providing modulated analog television signals at the intermediate frequency, and wherein the configurable parameters of the tunable bandpass filter and the tunable notch filter are set by the signal processor unit to at least one second configuration in response to the output of the tuner providing modulated digital television signals at the intermediate frequency.

7. The television receiver of claim 6, wherein the demodulator further includes:
a tunable audio bandpass filter having an input coupled to the output of the high pass filter and having an output;
a tunable audio notch filter having an input coupled to the output of the tunable audio bandpass filter and having an output;
a second automatic gain control circuit having an input coupled to the output of the tunable audio notch filter; and
an audio demodulator coupled to the second automatic gain control circuit to provide demodulated audio signals in response to the output of the tuner providing modulated analog television signals at the intermediate frequency.

8. The television receiver of claim 7, wherein a gain of the second automatic gain control circuit is controlled based upon an energy level of the demodulated audio signals.

9. The television receiver of claim 7, wherein the demodulator further comprises:
an equalizer coupled to the single demodulator to provide composite video baseband signals in response to the output of the tuner providing modulated analog television signals; and
a forward error correction unit coupled to the equalizer to provide an MPEG transport stream in response to the output of the tuner providing modulated digital television signals.

10. The television receiver of claim 9, wherein the demodulator further comprises:
a first delay line coupled between the single demodulator and the audio demodulator; and
a second delay line coupled between the second automatic gain control circuit and the audio demodulator;
wherein the first delay line and the second delay line are configured by the signal processor unit to provide synchronization between the composite video baseband signals provided by the equalizer and the demodulated audio signals provided by the audio demodulator.

11. A method of receiving television signals, comprising acts of:
    receiving, by a tuner, radio frequency signals that include modulated analog television signals and modulated digital television signals and providing, by the tuner, a selected one of the modulated analog television signals and the modulated digital television signals at an intermediate frequency;
    filtering, amplifying, and demodulating the selected one of the modulated analog television signals and the modulated digital television signals provided at the intermediate frequency according to a first set of configuration parameters using a first demodulation signal path in response to the selected one of the modulated analog television signals and the modulated digital television signals at the intermediate frequency being a modulated analog television signal at the intermediate frequency, wherein the act of filtering, amplifying, and demodulating according to the first set of configuration parameters includes filtering audio information from the modulated analog television signals to provide video-only portions of the modulated analog television signals;
    filtering, amplifying, and demodulating the selected one of the modulated analog television signals and the modulated digital television signals provided at the intermediate frequency according to a second set of configuration parameters using the first demodulation signal path in response to the selected one of the modulated analog television signals and the modulated digital television signals at the intermediate frequency being a modulated digital television signal at the intermediate frequency;
    controlling a gain of the tuner based upon a peak signal level of the video-only portions of the modulated analog television signal at the intermediate frequency in response to the tuner providing the modulated analog television signal at the intermediate frequency; and
    controlling the gain of the tuner based upon an energy level of the modulated digital television signal at the intermediate frequency in response to the tuner providing the modulated digital television signal at the intermediate frequency.

12. The method of claim 11, wherein the act of amplifying includes acts of receiving, at an intermediate frequency amplifier, the selected one of the modulated analog television signal at the intermediate frequency and the modulated digital television signal at the intermediate frequency, and amplifying the selected one of the modulated analog television signal at the intermediate frequency and the modulated digital television signal at the intermediate frequency based upon a gain control signal, the method further comprising an act of:
    controlling the gain of the intermediate frequency amplifier based upon the peak signal level of the video-only portions of the modulated analog television signal at the intermediate frequency in response to the tuner providing the modulated analog television signal at the intermediate frequency; and
    controlling the gain of the intermediate frequency amplifier based upon the energy level of the modulated digital television signal at the intermediate frequency in response to the tuner providing the modulated digital television signal at the intermediate frequency.

13. The method of claim 12, wherein the act of demodulating includes acts of:
    digitizing the amplified selected one of the modulated analog television signal at the intermediate frequency and the modulated digital television signal at the intermediate frequency to provide digital signals; and
    filtering the digital signals to remove any bias generated during the act of digitizing.

14. The method of claim 13, wherein the act of demodulating further includes:
    amplifying the video-only portions of the modulated analog television signals based on peak signal levels of the video-only portions of the modulated analog television signals in response to the tuner providing the modulated analog television signal at the intermediate frequency; and
    amplifying the digital signals based on energy level of the digital signals in response to the tuner providing the modulated digital television signal at the intermediate frequency.

15. The method of claim 14, wherein the act of demodulating further includes:
    demodulating the video-only portions of the modulated analog television signals using a first demodulator to provide demodulated analog video television signals in response to the to the tuner providing the modulated analog television signal at the intermediate frequency; and
    demodulating the digital signals using the first demodulator to provide an MPEG transport stream in response to the tuner providing the modulated digital television signal at the intermediate frequency.

16. The television receiver of claim 2, wherein the at least one tunable filter includes:
    a tunable bandpass filter having an input coupled to the output of the high pass filter and having an output; and
    a tunable notch filter having an input coupled to the output of the tunable bandpass filter and having an output;
    wherein the automatic gain controller provides the first gain control signal to the tuner and the second gain control signal to the intermediate frequency amplifier based upon the signal strength indication provided by the tuner and a peak signal level of the video portions of the modulated analog television signals at the output of the tunable notch filter in response to the output of the tuner providing modulated analog television signals at the intermediate frequency.

17. The television receiver of claim 16, wherein the demodulator further includes:
    a first automatic gain control circuit having an input coupled to the output of the tunable notch filter and having an output; and
    a single demodulator coupled to the output of the first automatic gain control circuit to provide demodulated digital video signals in response to the output of the tuner providing modulated analog television signals at the intermediate frequency and to provide demodulated digital audio-video signals in response to the output of the tuner providing modulated digital television signals at the intermediate frequency.

18. The television receiver of claim 17, wherein a gain of the first automatic gain control circuit is controlled based upon a peak signal level of the demodulated digital video signals in response to the output of the tuner providing modulated analog television signals at the intermediate frequency, and wherein the gain of the first automatic gain control circuit is controlled based upon an energy level of the demodulated digital audio-video signals in response to the output of the tuner providing modulated digital television signals at the intermediate frequency.

19. The television receiver of claim 18, wherein the demodulator further includes:
  a tunable audio bandpass filter having an input coupled to the output of the high pass filter and having an output;
  a tunable audio notch filter having an input coupled to the output of the tunable audio bandpass filter and having an output;
  a second automatic gain control circuit having an input coupled to the output of the tunable audio notch filter; and
  an audio demodulator coupled to the second automatic gain control circuit to provide demodulated audio signals in response to the output of the tuner providing modulated analog television signals at the intermediate frequency.

20. The television receiver of claim 19, wherein a gain of the second automatic gain control circuit is controlled based upon an energy level of the demodulated audio signals.

* * * * *